Dec. 16, 1924.
E. G. VON GUNTEN
STRAINER DEVICE
Filed Aug. 7, 1922
1,519,890
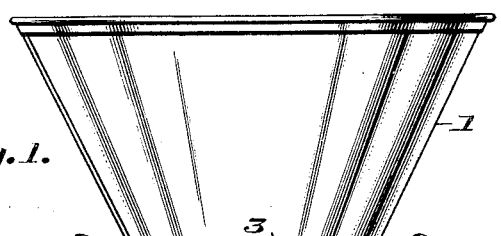
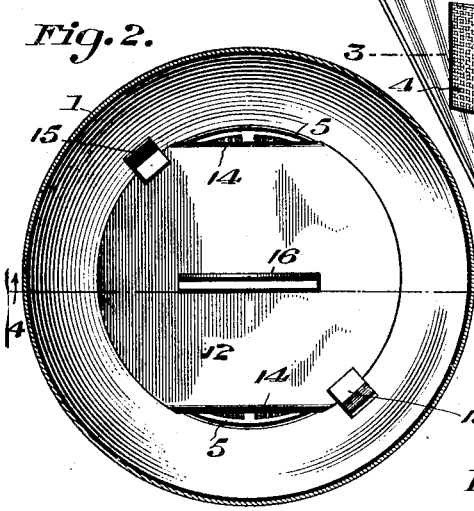
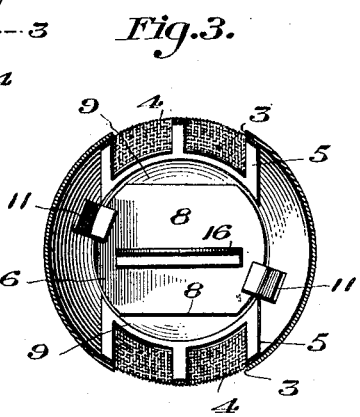
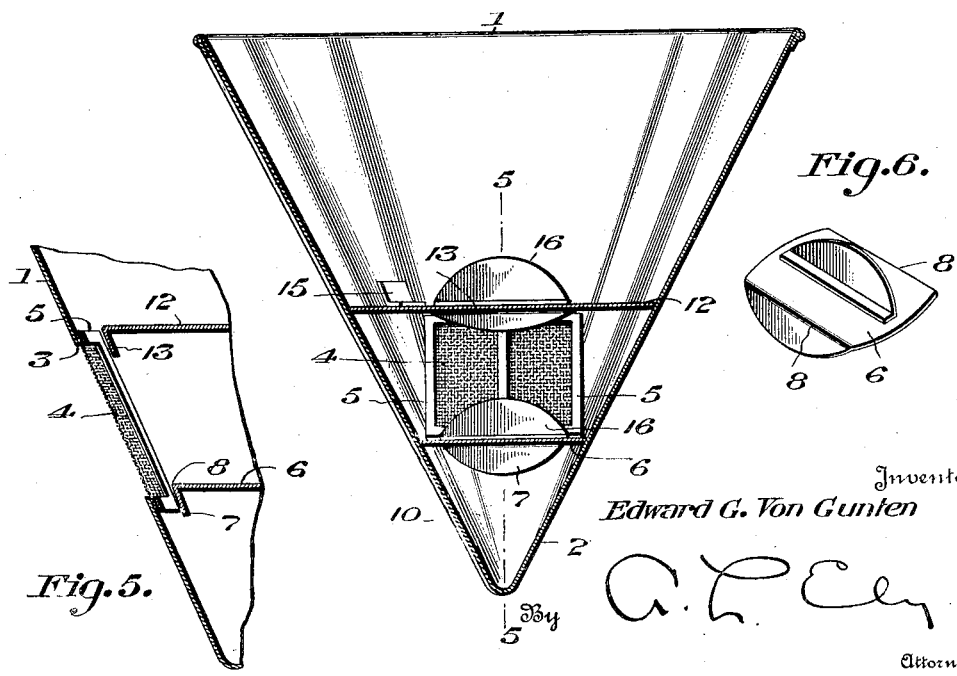
Inventor
Edward G. Von Gunten
Attorney Patented Dec. 16, 1924.

1,519,890

UNITED STATES PATENT OFFICE.

EDWARD G. VON GUNTEN, OF AKRON, OHIO, ASSIGNOR TO THE FARMER'S SANITARY STRAINER & MANUFACTURING COMPANY, OF AKRON, OHIO, A CORPORATION.

STRAINER DEVICE.

Application filed August 7, 1922. Serial No. 580,090.

*To all whom it may concern:*

Be it known that I, EDWARD G. VON GUNTEN, a citizen of the United States, residing at Akron, in the county of Summit, State of Ohio, have invented certain new and useful Improvements in Strainer Devices, of which the following is a specification.

My invention relates to improvements in strainer devices designed particularly for use in straining milk, although it may be used in conjunction with other liquids as will presently appear.

The primary purpose of my invention is to provide a practical form of milk strainer which may be used as a funnel and which is adapted for separating the sediment from the milk as it is strained and entrapping it in such position that it is out of the path followed by the milk during the straining operation. By this means the milk is prevented from being strained through the accumulated sediment from the milk that has previously been strained and is consequently free from such impurities as it may have acquired in passing through such an accumulation.

Another object of my invention is to provide a strainer device in which a fine strainer medium may be utilized and prevented from becoming clogged with the sediment and dirt from the milk.

Other objects, and advantages, such as simplicity of construction and relatively low cost of manufacture will appear and the nature of my invention will be more fully understood when the following description is read in conjunction with the drawings accompanying and forming a part of this specification.

In said drawings:

Figure 1 is a side elevational view illustrating a strainer constructed in accordance with my invention;

Figure 2 is a transverse sectional view, on an enlarged scale, taken on the line 2—2 of Figure 1;

Figure 3 is a transverse sectional view, on an enlarged scale, taken on the line 3—3 of Figure 1;

Figure 4 is a vertical sectional view taken on the line 4—4 of Figure 2;

Figure 5 is a fragmentary sectional view taken on the line 5—5 of Figure 4; and

Figure 6 is a perspective view of a detail of the invention.

The invention will now be described in detail. Referring to the drawings, in which a preferred embodiment of my invention has been illustrated, the numeral 1 designates a conical casing comprising the container portion of my novel strainer device. The casing may be constructed of any suitable material, such as sheet tin, and is open at its upper end. The apex of the casing is closed to form a bottom portion 2 for the container. Upon diametrically opposite sides of the casing 1, at a distance above the portion 2 suitable for a purpose presently apparent, openings 3 are provided. These openings 3 are preferably rectangular in form to provide transversely straight upper and lower edges and relatively long outlet for the liquid extending in the direction of the height of the casing.

Strainer members 4 of fine mesh reticulated material are provided over the openings 3 and are secured to the marginal portions of the casing around said openings in any suitable manner, whereby they are disposed at opposite angles to the vertical and converge toward their lower edges. In the present instance, the strainer members are secured between the casing and a rectangular frame 5 that may be soldered or otherwise secured to the casing. Immediately below the strainer members 4, the casing 1 is divided by a removable transverse partition 6. The partition 6 is substantially circular and its edge portion is bent downwardly, as at 7, to provide diametrically opposite straight ledges 8. When the partition 6 is properly positioned within the casing 1, its straight ledges are positioned in register with the strainer members 4 whereby an opening 9 is provided between each ledge 8 and the adjacent strainer member 4, as will be seen in Figure 3 of the drawings. At the same time the partition 6 divides the casing above the apex, or closed portion 2, to form a trap chamber 10. Preferably oppositely disposed keeper lugs 11 are provided upon the walls of the casing 1 immediately above the partition 6, and to one side of the strainer members 4, in such position that the partition 6 may be inserted in the casing between the lugs and turned thereunder, as shown in Figure 3 of the drawings. By this means the partition is securely held in place and is readily removable for the purpose of cleaning the strainer parts as will be obvious.

A second transverse partition 12 is provided in the casing 1 above the partition 6. The partition 12 is similar in character to partition 6, but is larger in diameter. Preferably it is of such diameter that it will fit within the casing immediately above the top edge of the strainer members 4. Opposite portions 13 of the edges of the partition 12 are bent downwardly to provide ledges 14 which are also adapted to be positioned in register with the strainer members 4 whereby they are disposed in vertical alignment with the ledges 8 of partition 6 and the screens. Keeper lugs 15 are provided upon the walls of the casing 1, similar to those previously described with reference to the partition 6, whereby the partition 12 may be readily secured in, or removed from, the casing. Each partition 6 and 12 may be provided with a suitable finger grip such as that shown at 16, whereby they may be easily turned in securing or removing them from the casing. It will be noted that in the preferred form of the invention the openings at the sides of the partitions are arranged in line with the strainers on both sides of the funnel, so that the milk is directed over the screen and the sediment into the lowermost chamber 10. The upper partition not only serves to so direct the milk, but also prevents splashing of the milk.

My novel strainer operates as follows:

The milk, being poured into the open end of the container 1, pours down over the ledges 14 of the partition 12 and flows onto the strainer members 4. Because of the angular position of the strainer members 4, the milk flows downwardly over them in the direction of their length and consequently washes the strainer members clean, while, at the same time, it escapes in a general lateral direction therethrough. Because of this cleaning action, I am enabled to utilize a very fine mesh for the strainer members. The sediment and residue from the milk is washed from the cleaner members 4 and deposited in the trap chamber 10. The partition 6 serves to prevent back wash of the sediment from the trap chamber 10 into the space between partitions 6 and 12. At the same time it also acts to direct the milk laterally against the strainer member 4.

The foregoing constitutes a description of a preferred embodiment of my invention, but it is to be understood that changes and modifications may be resorted to without departing from the spirit of the invention unless otherwise indicated in the claims appended hereto.

What I claim is:

1. In a strainer device, a funnel having its outer wall provided with an opening spaced from the lower end of the funnel, a screen over the opening, and a removable partition extending across the funnel above the opening, the said partition fitting the inside of the funnel except at a point above and in line with the screen where it is removed to form a discharge opening over the screen.

2. A strainer device for liquids comprising, a container having a closed bottom portion said container being provided with oppositely disposed inclined outlets spaced from said bottom portion, screens covering the openings, a removable transverse partition in the container adjacent the top of the screens constructed to provide openings between its edge and the screens, and a removable transverse partition in the container adjacent the bottom of the screens also constructed to provide openings between its edge and said screens.

3. A strainer device for liquids comprising, a conical container having a closed bottom portion said container being provided with oppositely disposed inclined outlet openings spaced from said bottom portion, screens covering said openings, a removable transverse partition in the container adjacent the top of the screens constructed to provide openings between its edge and said screens, and a second removable transverse partition in the container adjacent the bottom of the screens also constructed to provide openings between its edge and said screens.

4. A strainer for milk or other liquids comprising, an inverted conical funnel, transverse partitions dividing said funnel into three chambers, and screens located in the walls of the funnel in the intermediate chamber.

5. A strainer for milk or other liquids comprising, an inverted conical funnel, transverse partitions dividing said funnel into three chambers, and screens located in the walls of the funnel in the intermediate chamber, said partitions being provided with openings arranged in line with the screens.

6. In a strainer device, a funnel having an outer wall provided with an opening, a screen over the opening, and a horizontal partition spanning the funnel above the opening, said partition being removed at a point above and in line with the screen.

7. In a strainer device, a tapered funnel having an opening in the inclined wall thereof, a screen over the opening, and a removable partition in the funnel above the screen, the said partition fitting within the funnel and apertured above the screen to provide an opening to discharge the fluid over the screen.

8. In a strainer device, a tapered funnel having openings, screens over the openings, and a substantially circular horizontal partition removably secured within the funnel and closing the funnel except at points above and in line with the screens, where it is spaced from the wall to provide openings for directing the fluid over the screens.

9. In a strainer device, a funnel shaped body portion, a screen located within the wall of the funnel, a partition below the screen, and an opening in the partition in line with the screen.

10. In a strainer device, a funnel shaped body portion, a screen located within the wall of the funnel, and a removable horizontal partition below the screen, said partition closing the funnel except at points in line with the screen where it is spaced from the wall to provide an opening in the partition.

EDWARD G. VON GUNTEN.